United States Patent [19]

Hogan

[11] 4,047,812
[45] Sept. 13, 1977

[54] DOCUMENT BELT WITH IMPERFORATE BANDS

[75] Inventor: James W. Hogan, Pittsford, N.Y.

[73] Assignee: Xerox Corporation, Stamford, Conn.

[21] Appl. No.: 649,174

[22] Filed: Jan. 15, 1976

[51] Int. Cl.² .......................................... G03B 27/62
[52] U.S. Cl. ..................................................... 355/76
[58] Field of Search ...................... 355/76, 73, 50, 51; 271/34

[56] References Cited

U.S. PATENT DOCUMENTS

| | | | |
|---|---|---|---|
| 3,245,291 | 4/1966 | Wick et al. | 355/76 |
| 3,373,989 | 3/1968 | Le Baron | 271/34 X |
| 3,451,754 | 6/1969 | Prew | 355/76 X |
| 3,469,916 | 9/1969 | Sloan | 355/51 |
| 3,606,305 | 9/1971 | Debackere et al. | 271/34 X |
| 3,754,826 | 8/1973 | Kobayashi et al. | 355/76 X |

Primary Examiner—Donald A. Griffin

[57] ABSTRACT

In a perforated vacuum belt system for transporting documents to be copied in an imaging station, where the documents including standard documents of a standard dimension, an improvement wherein the vacuum belt has narrow parallel imperforate endless bands extending in the movement direction of the belt. The bands are spaced apart by a distance equal to the standard dimension of the standard document, to provide an imperforate image background area of the belt for the edges of the standard documents, by the document's edges lying within the imperforate bands. Additional bands can be provided to accommodate documents of different widths.

4 Claims, 3 Drawing Figures

DOCUMENT BELT WITH IMPERFORATE BANDS

The present invention relates to document copying apparatus, and more particularly to vacuum document transport belt apparatus therefor.

Document copying, particularly for the faster xerographic copiers now in commercial use, presents challenges in the faster handling of the documents being copied in order to utilize the faster copying capability of the copier. [The terms copier or copying as used herein is intended to also cover duplicators and other optional reproduction devices]. The transport of the documents to be copied in and out of an imaging station by means of an endless perforated vacuum belt is known. One such system is disclosed in detail in a pending U.S. Patent application Ser. No. 561,465, filed Mar. 26, 1975, by John R. Caldwell, (Group 313). Various references have been cited in that specification, and copies of references have been provided for that file. A further disclosure of that vacuum document belt system is in another U. S. Patent application Ser. No. 632,426, filed Nov. 17, 1975, by Patrick T. Ferrari. The present invention is an improvement in vacuum belt document transport systems, specifically including those of the type disclosed in the above two pending applications. Accordingly, those applications, and the references cited and disclosed therein, are hereby incorporated by reference in the present specification. It is noted that all three applications are commonly assigned.

The specific problem to which the present invention is addressed is that of show-around of the vacuum apertures in the area of the vacuum belt around the document. Document show-around can be caused by a document not being precisely registered, skewed or the document image not overfilling the image on the copy sheet (i.e., where a 1:1 or less magnification ratio is utilized). In such cases the image reproduced on the copy sheet will include that portion of the vacuum belt which is within the image area, but not covered by the document. This show-around problem is aggravated where the vacuum belt has apertures thereon which print-out in visible image patterns on the copy from the show-around areas. One way to avoid the latter problem is to use vacuum belts with very fine or convolute vacuum apertures, such as porous foam, cloth, or unwoven fibrous materials on the document carrying surface. However, such vacuum belt materials have other problems, such as wearability, contamination, and clogging of the air passageways by dirt, especially the loose paper fibers which can come from the document handling. Thus, larger, but more visible, vacuum holes in the belt are desirable to avoid these other problems. With the present invention, the advantages of straight, larger sized (visible), vacuum apertures can be utilized for the vacuum belt, yet, without any significant sacrifice in the vacuum retention of the document by the belt, the vacuum hole show-around problem can be eliminated for the two side edges of standard sized documents, even with relatively coarse alignment or registration of the documents on the vacuum belt. This advantage can be provided for two or more standard document widths, as disclosed herein.

Further objects, features, and advantages of the present invention pertain to the particular apparatus and details whereby the above-mentioned aspects of the invention are attained. Accordingly, the invention will be better understood by reference to the following description and to the drawings forming a part thereof, wherein:

FIG. 1A is a magnified small portion of the vacuum belt of FIG. 1, illustrating the configuration of the vacuum apertures therethrough.

Figure 1:
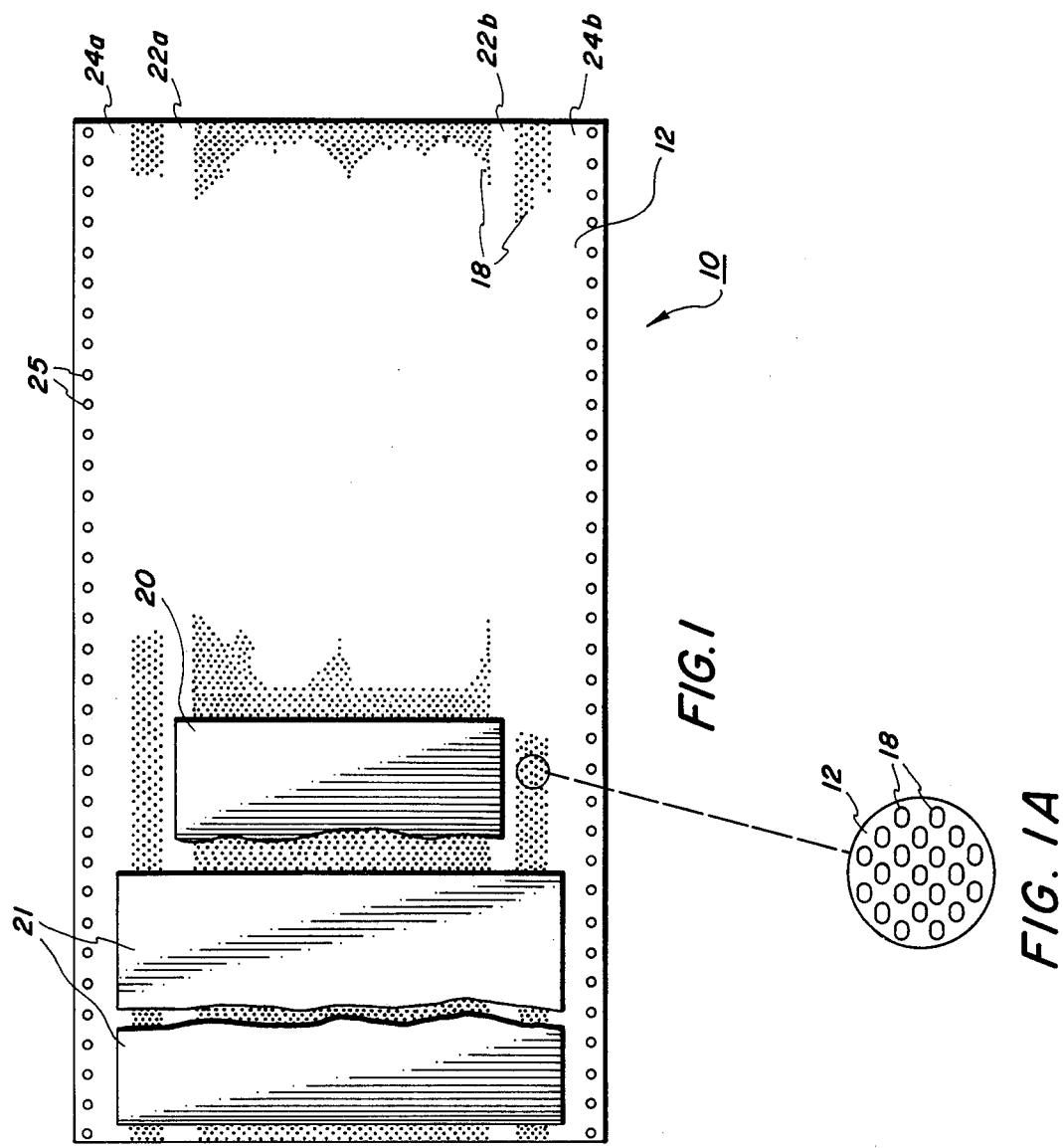
FIG. 1 is a top view of an exemplary vacuum belt system embodiment of the present invention, with portions of two standard size documents operatively positioned thereon by way of illustration.
Figure 2:
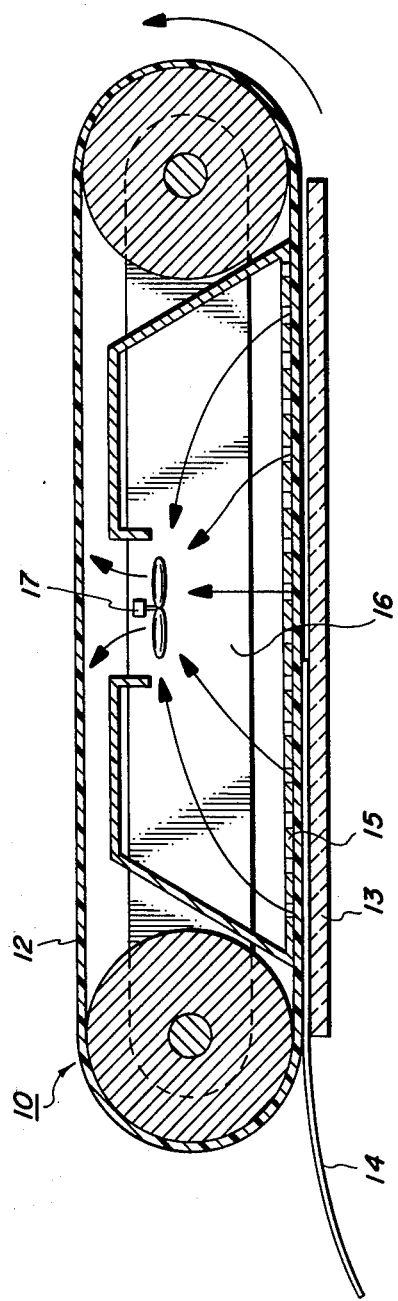
FIG. 2 is a cross-sectional side view of the embodiment of FIGS. 1 and 1A schematically illustrating a vacuum belt system in operation over the imaging platen for a copier.

Referring now to the drawings, FIGS. 1, 1A, and 2, there is shown therein an exemplary vacuum belt document transport system 10 with an endless vacuum belt 12 in accordance with the present invention. For clarity various components are illustrated schematically. The disclosed document handling system 10 is particularly suitable as a relatively simple attachment or accessory to xerographic copiers of various types. Since the xerographic copier itself may be conventional, and need not be significantly modified for the present invention, the details thereof are not disclosed herein, and only the associated transparent glass platen 13 of a copier, through which the document is imaged, is illustrated (in FIG. 2).

Referring now to FIG. 2, there is illustrated a document 14 being transported onto (overlying) the copier platen 13 by the movement of an endless vacuum belt 12. A vacuum is supplied to the lower flight or run of the vacuum belt 12 by means of an apertured vacuum plate 15 which forms the bottom wall of the vacuum plenum 16. The plenum 16 is partially evacuated by a blower 17. The vacuum provided through the large apertures in the plate 15 is applied to the rear side of the document 14 through a multiplicity of small apertures 18 (see FIG. 1A) through the vacuum belt 12. These apertures 18 preferably extend over substantially the entire surface of the vacuum belt 12 on which documents are to be retained.

While not illustrated in FIG. 2, it will be obvious that a conventional illumination system and imaging lens is provided for viewing the illuminated document on the vacuum belt 12 through the platen 13, and for focusing the image of that document onto the photoreceptor drum or other copying surface. As disclosed in the previously cited pending applications, the copier lens preferably has an optical depth of field which would accommodate a document surface lying anywhere within the space between the document belt and the platen. The document is preferably held by the vacuum belt close to, but somewhat spaced away from, the platen. Yet the platen is sufficiently closely spaced from the vacuum belt, over the imaging station, so as to confine the documents to a present maximum distance away from the vacuum belt in the imaging station. That is, any wrinkled or curled edges of documents which are resisting the vacuum hold-down forces of the vacuum belt are not allowed to extend into an out-of-focus position within the imaging station.

Referring now more particularly to FIG. 1, the document belt transport system 10 and the vacuum belt 12 are adapted to transport a wide variety of sizes and shapes of documents thereon with the widespread closely spaced vacuum aperture system. However, most documents to be copied are conventionally of certain standard, commercial, dimensions. For example, in the United States the common standard document dimensions are 8½ by 11 inches (letter size) or 8½ by 14 inches (legal size). The two illustrated document portions 20 and 21, respectively, and the belt 12, are shown to scale in FIG. 1 for those standard documents. It will be appreciated that other document dimensions are standard or conventional in other countries.

The belt 12 is intended for the imaging, in sequence, of only one document at a time. However, for illustrative purposes portions of the two documents 20 and 21 are shown closely adjacent one another on the belt here in FIG. 1., in a closer than normal inter-document spacing or pitch. However, they are shown in the desired registration relative to the belt laterally (transverse the direction of movement of the document belt 12 and the documents thereon).

There is illustrated in FIG. 1 a central registration document system in which the center of the document is registered with, and moves with, the center of the belt through the center of the document imaging area. However, it will be appreciated that side-edge registration copiers are also well known, in which one edge of the document is always registered at one side of the document transport and one side of the imaging platen. The present invention is readily suitable by modifications to such edge registration systems, as will be subsequently described. Also, the system disclosed here is a long edge first or sideways document transport, as opposed to a short edge first or endwise document transport, to which the present invention may also be adapted.

Still referring to FIG. 1, it is seen that the belt 12 is wider than either of the standard documents 20 or 21 in the dimension transverse their movement direction. The belt 12 provides an image background area around the documents in the event that the image area is larger than the documents, i.e., for the reasons previously discussed. Referring first to the smaller of the standard documents 20, it may be seen that two narrow imperforated areas or bands 22a and 22b are provided in the belt 12. These two smooth, unapertured areas 22a and 22b of the belt 12 are parallel and spaced apart from one another by a distance between their centers which is equal to the standard width of the standard document 20. As used here the term width refers to the orientation transverse the belt. For the long edge feeding system here, this dimension is the top to bottom length of the document. The areas 22a and 22b provide an imperforate image background area of the belt 12 extending beyond the edges of the document 20, since the two document edges lie centrally within their respective areas unapertured 22a and 22b. The width of the areas 22a and 22b is sufficiently wide to allow substantial or relatively gross skewing or misregistration of the document 20 without exposing any of the vacuum apertures 18 anywhere along the document edge areas.

It has been seen that the widths of the imperforate bands, i.e., their dimensions transverse the movement direction of the belt, are only a minor portion of the width of the document. Thus, only a minor area of the document at its outer edges is not subjected to vacuum retention forces. This lack of applied vacuum at the edge areas of the document does not have any significant loss of vacuum retention for the document. There is no significant pressure differential around the outer edges of the document anyway, due to the air flow around the edges into the exposed vacuum apertures. Also, it has been found that a curled-away edge of a document cannot be pulled down against the vacuum belt readily, since the beam strength or stiffness of such a curled edge increases as the edge of the document is approached, i.e., the shorter the cantilevered beam length of the curled edge the greater its resistance to being held flat against the vacuum belt.

In the central registration configuration shown here, the bands 22a and 22b are concentric with the central axis of the belt. That is, they are centered for central registration of the document 20.

It may be seen that since the entire major area of the belt 12, between the two bands 22a and 22b, is fully apertured, that documents of a smaller dimension than the document 20 are not affected at all by the unapertured areas 22a and 22b. They are retained by a vacuum force applied over their entire area. The minor reduction in the vacuum area in the portions of a larger document, such as the document 21, where those documents extend over the imperforate areas 22a and 22b, is not significant. Such documents have a much larger area overlying the majority of the belt width which is apertured which is more than sufficient to hold them against the belt.

The bands 22a and 22b preferably have a width less than approximately one centimeter, since that is sufficient to provide the above-stated functions without leaving a significant area of a document without vacuum retention. This width provides a sufficient edge bleed-out background area for the normal copying of a document within easily achievable manual or automatic registration systems.

The bands 22a and 22b are provided here in areas of the belt which are substantially spaced from the belt edges, well inside of additional apertured areas. However, it may be seen that an additional pair of imperforate bands 24a and 24b are also provided here, spaced apart by a distance equal to the second standard document 21 standard dimension for which this system is adapted. The bands 24a and 24b are parallel, but outside of, the bands 22a and 22b. Desirably, as shown here, these additional imperforate bands 24a and 24b are provided adjacent the two outer edges of the belt, so that the entire outer edge area of the belt is substantially imperforate. This gives added strength to the belt and is particularly desirable, where, as here, the vacuum belt 12 further includes sprocket holes 25 adjacent its outer edges, spaced inside the imperforate areas 24a and 24b, to provide for the sprocket driving of the belt 12 by suitable conventional mechanical drive means. The bands 24a and 24b provide the function for the document 21 provided by the bands 22a and 22b for the document 20.

The maximum dimensions or diameters of the vacuum apertures 18, and the spacings between the apertures, are much less than the widths of the imperforate bands. Preferably these belt perforations are less that 0.5 millimeters in diameter, and are formed by perforating a belt of Mylar or other suitable material, which has a light reflective surface or suitable coating.

If the belt transport system were for a document edge registration system, rather than a central registration system, as previously noted, then the same function can be provided, except that one imperforate band at one side of the belt would provide the imperforate show-around area for one edge of all the documents being transported regardless of their size. Thus, for such an edge registration belt system, only three imperforate bands can provide for two different standard document dimensions, rather than the four bands shown here.

That is, one edge band and two interior bands, respectively spaced from the edge band by the two document dimensions.

The document handling system disclosed herein is preferred; however, numerous further variations and modifications may be made therein by those skilled in the art. The following claims are intended to cover all such variations and modifications as fall within the spirit and scope of the invention.

What is claimed is:

1. In a vacuum belt document transport system wherein documents are transported by and copied on a vacuum belt closely overlying a platen imaging station, including means for moving said documents in a predetermined movement direction on said vacuum belt, wherein said vacuum belt has a multiplicity of fine apertures extending substantially uniformly thereover to hold said documents against said belt substantially uniformly by vacuum forces exerted through said apertures, wherein said vacuum belt is wider than said documents transverse said movement direction, wherein said documents include at least two different standard documents of two different preselected standard edge-to-edge dimensions extending transverse said movement direction, and wherein said belt provides an image background around said documents to reduce edge showaround in the copying of said documents, the improvement wherein said vacuum belt has at least three narrow unapertured areas extending linearly in said movement direction of said belt, said unapertured areas being parallel imperforate bands spaced apart from one another by distances between the centers of said bands transverse said movement direction equal to said two standard dimensions of said two standard documents to provide an unapertured image background area of said belt for both edges of both said standard documents, with both said edges of said standard documents lying within said unapertured bands of said belt in said imaging station, and wherein the dimensions of said unapertured bands transverse said movement direction are only a minor portion of said standard dimension of said standard document and minor areas of said vacuum belt, and wherein substantially the entire major area of the vacuum belt between all three of said unapertured bands is fully apertured to provide said vacuum holding of said documents to said belt.

2. The document transport system of claim 1, wherein there are two pairs of said imperforate bands, corresponding to said two different standard document dimensions, and wherein both said pairs of said imperforate bands are concentric a common central axis of said belt in said movement direction.

3. The document transport system of claim 1, wherein said bands have a dimension transverse said movement direction of less than approximately 1 centimeter, and said belt perforations are less than approximately 0.5 millimeters in diameter.

4. The document transport system of claim 1, wherein said belt and said imperforate bands thereon are endless.

* * * * *